United States Patent
Kenney et al.

(10) Patent No.: US 9,819,386 B2
(45) Date of Patent: Nov. 14, 2017

(54) METHODS AND ARRANGEMENTS TO INCREASE TRANSMISSION RANGE

(71) Applicant: INTEL IP CORPORATION, Santa Clara, CA (US)

(72) Inventors: Thomas J. Kenney, Portland, OR (US); Eldad Perahia, Portland, OR (US); Shahrnaz Azizi, Cupertino, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/108,573

(22) PCT Filed: Dec. 28, 2013

(86) PCT No.: PCT/US2013/078166
§ 371 (c)(1),
(2) Date: Jun. 27, 2016

(87) PCT Pub. No.: WO2015/099808
PCT Pub. Date: Jul. 2, 2015

(65) Prior Publication Data
US 2016/0329929 A1    Nov. 10, 2016

(51) Int. Cl.
*H04B 1/00* (2006.01)
*H04B 1/713* (2011.01)
*H04L 5/00* (2006.01)

(52) U.S. Cl.
CPC ........... *H04B 1/713* (2013.01); *H04L 5/0012* (2013.01); *H04L 5/0039* (2013.01);
(Continued)

(58) Field of Classification Search
CPC .............................. H04B 1/7143; H04B 1/713; H04B 2201/694; H04B 2201/71346;
(Continued)

(56) References Cited

U.S. PATENT DOCUMENTS

2007/0098045 A1\* 5/2007 Cameron ............. G01R 13/029
                                                                    375/130
2007/0147479 A1    6/2007 Yamasuge
(Continued)

FOREIGN PATENT DOCUMENTS

JP    2004104475 A    4/2004
WO   2009139724 A1   11/2009

OTHER PUBLICATIONS

International Search Report and Written Opinion received for PCT Patent Application No. PCT/US2013/078166, mailed on Sep. 24, 2014, 13 pages.
(Continued)

*Primary Examiner* — Khanh C Tran

(57) ABSTRACT

Logic may transmit or receive communications that hop frequencies in response to trigger events across a large bandwidth. Logic may generate a communication with a contiguous or non-contiguous bandwidth based upon frequency segments of 80 and/or 160 MHz. Logic may generate a communication with a contiguous bandwidth of 480 MHz. Logic may generate a communication with a non-contiguous bandwidth of 480 MHz. Logic may transmit or receive communications with a 480 MHz bandwidth that hop across a 3 GigaHertz (GHz) bandwidth of frequency channels. Logic may determine a channel-hopping pattern. Logic may hop frequency channels after each link transmission. Logic may hop channels after a fixed time interval. And logic may hop frequency channels in response to another triggering event.

25 Claims, 7 Drawing Sheets

(52) U.S. Cl.
CPC .................. *H04B 2201/694* (2013.01); *H04B 2201/71346* (2013.01); *H04L 5/001* (2013.01)

(58) Field of Classification Search
CPC ..... H04L 5/001; H04L 5/0012; H04L 5/0039; H04W 72/0453
See application file for complete search history.

(56) References Cited

U.S. PATENT DOCUMENTS

| | | | |
|---|---|---|---|
| 2010/0284363 | A1 | 11/2010 | Ahn et al. |
| 2011/0142009 | A1* | 6/2011 | Lindoff ................ H04L 5/0053 370/332 |
| 2012/0307869 | A1 | 12/2012 | Charbit et al. |
| 2015/0215903 | A1* | 7/2015 | Zhao ..................... H04W 72/04 370/329 |
| 2015/0280777 | A1* | 10/2015 | Azizi ................... H04B 1/7143 370/330 |
| 2016/0057693 | A1* | 2/2016 | Nagata ................. H04W 8/005 370/254 |
| 2016/0071402 | A1* | 3/2016 | Chiarizio ............. G08B 27/008 340/539.17 |
| 2016/0309355 | A1* | 10/2016 | Seo ....................... H04W 8/005 |

OTHER PUBLICATIONS

International Preliminary Report on Patentability and Written Opinion received for PCT Patent Application No. PCT/US2013/078166, mailed on Jul. 7, 2016, 10 pages.

* cited by examiner

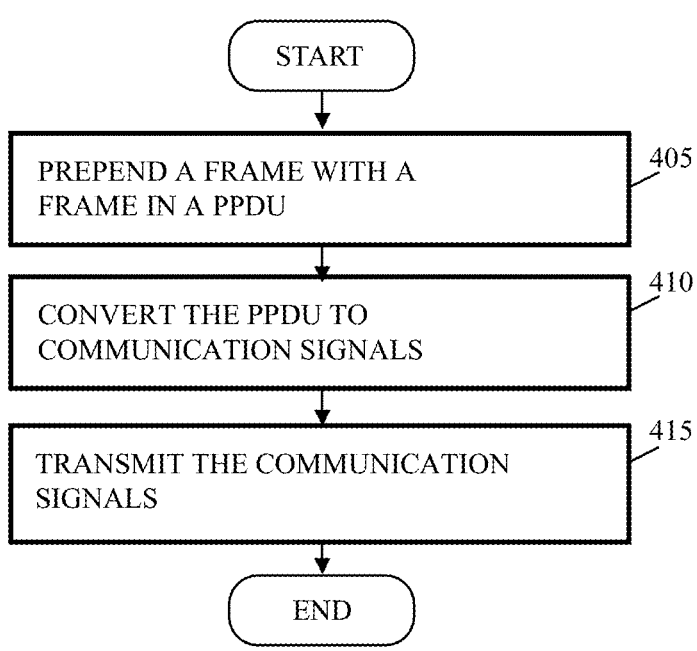

METHODS AND ARRANGEMENTS TO INCREASE TRANSMISSION RANGE

TECHNICAL FIELD

Embodiments are in the field of wireless communications. More particularly, embodiments may involve implementing frequency hopping to increase the transmission power and range of a communication.

BACKGROUND

A wireless communications system may utilize bi-directional signaling of control information to coordinate operations between geographically disparate communications devices. As a way to further evolve Wi-Fi (wireless fidelity) communications, there has been activity to make new frequency bands available in which Wi-Fi can be deployed. Two such bands include additional bandwidth in the 5 GHz band and 6-10 GHz bands. The Federal Communications Commission (FCC) announced this band was available for ultra-wideband use in 2002. The attractiveness to the band is that there is 3 GHz of contiguous bandwidth available globally. Other systems have attempted to use the band that withdrew or has had minimal market deployment. Thus, the spectrum is currently underutilized.

BRIEF DESCRIPTION OF THE DRAWINGS

FIGS. 4A-B depict embodiments of flowcharts to transmit, receive, decode, and interpret communications with frames as illustrated in FIGS. 1-2.

DETAILED DESCRIPTION OF EMBODIMENTS

Figure 1:
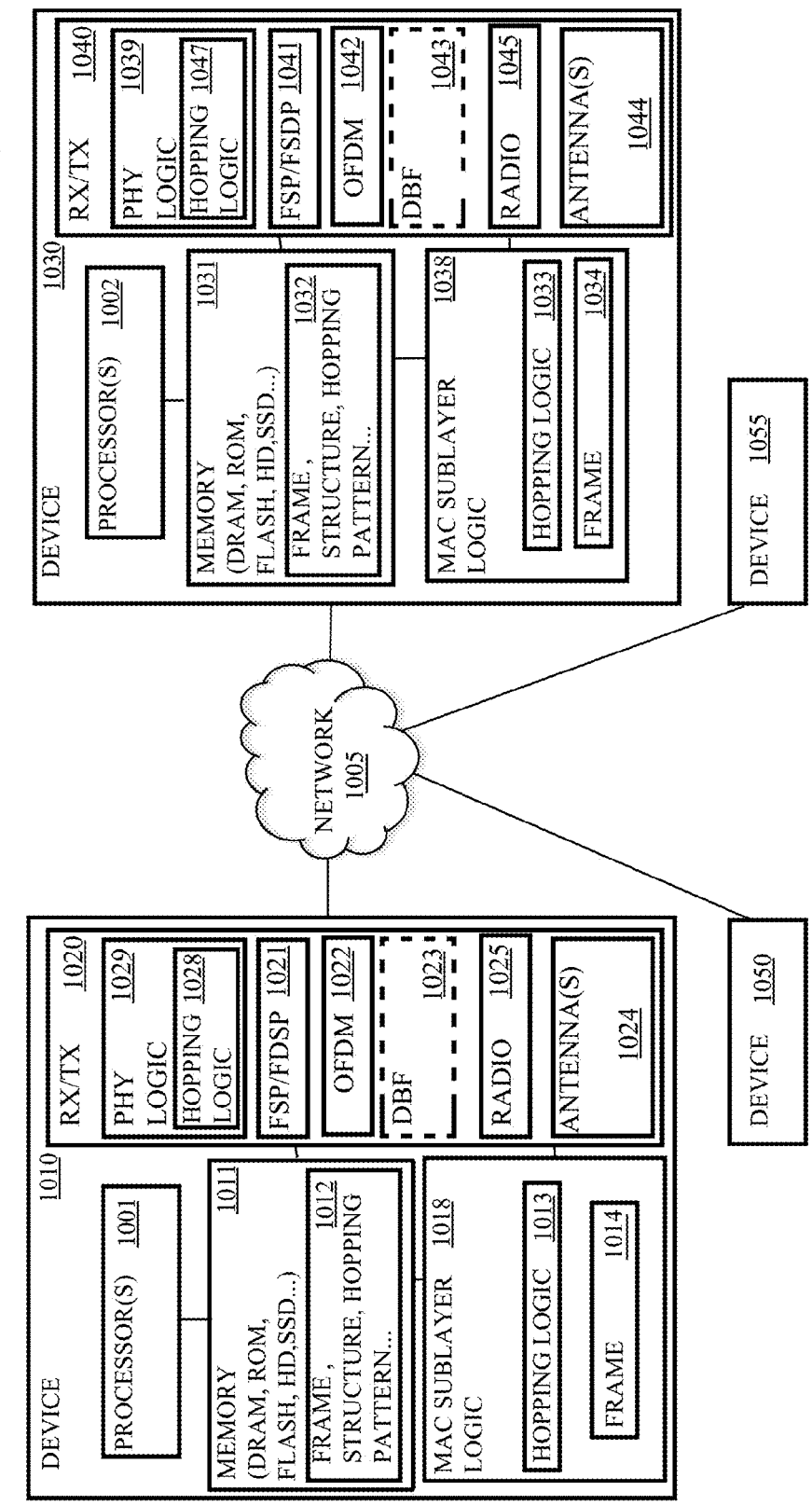
FIG. 1 depicts an embodiment of a wireless network comprising a plurality of communications devices, including multiple fixed or mobile communications devices.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

References to "one embodiment," "an embodiment," "example embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Embodiments may increase the transmission range of Wi-Fi (Wireless Fidelity) communications. Many embodiments focus on a 3 Gigahertz (GHz) bandwidths in 6-10 GHz. However, the embodiments are not limited to the bandwidths and frequency bands described herein.

A design issue related to usage of the 3 GHz bandwidth is a very restrictive power spectral density defined for the 6-10 GHz range as −41.3 decibel-milliwatt per Megahertz (dBm/MHz). Such power spectral density offers a short range but increasing the bandwidth utilized can increase the transmission range in many embodiments. One way to increase the utilized bandwidth is to implement a frequency hopping pattern that crosses, e.g., the 3 GHz bandwidth.

Several embodiments implement 80 MHz or 160 MHz bandwidth specifications of IEEE 802.11ac as frequency segments. In several embodiments, these frequency segments are used as building blocks to generate large bandwidth transmissions in multiples of 80 MHz and/or 160 MHz such as 480 MHz bandwidths. The 80 MHz or 160 MHz frequency segment may comprise the same subcarrier structure as the corresponding IEEE 802.11ac bandwidths. For example, in the 160 MHz bandwidth frequency segment, there are a total of 468 data subcarriers and 16 pilot subcarriers specified in IEEE 802.11ac. Thus in this example with three −160 MHz subbands to create a contiguous 480 MHz bandwidth communication, there are a total of 1404 data subcarriers in addition to 48 pilot subcarriers.

For some embodiments that implement a contiguous bandwidth, the subcarriers may be mapped to each of the three 160 MHz bands (for a total of 480 MHz) using a mapping function to a discrete Fourier transform module. Other embodiments may use 80 MHz frequency segments as the primary building block, or a mix of both 160 MHz and 80 MHz bandwidth frequency segments to create a larger bandwidth.

Several embodiments may divide the 3 GHz bandwidth into six 500 MHz channels. Hopping frequencies between three channels with 480 MHz bandwidth communications can gain 4.7 dBm in transmission power and, thus, extend the transmission range. Hopping frequencies over six of the channels can provide a gain of 7.8 dBm in transmission power.

Further embodiments may implement non-contiguous bandwidths in multiples of 80 MHz or 160 MHz and totaling 480 MHz. For instance, one embodiment may implement six non-contiguous, 80 MHz bandwidth transmissions and another embodiment may implement three non-contiguous, 160 MHz bandwidth transmissions. When using any such allocation, the group of signals may then hop to other frequencies in response to trigger events to allow the communications device to transmit with higher total power and still meet the United States (US) Federal Communications Commission (FCC) rules. In several embodiments, hopping may also improve system performance by improving frequency diversity.

In some embodiments, the transmissions may hop frequencies after each link transmission. In further embodiments, the transmissions may hop frequencies after a fixed time interval. And in other embodiments, the transmissions may hop frequencies based upon another triggering event.

In several embodiments, the medium access control (MAC) sublayer logic, or MAC logic, may determine the event to trigger a hop. In some embodiments, the MAC logic may select a predetermined pattern of hopping that the physical layer (PHY) logic is designed to or configured to implement. In some embodiments, the MAC logic my dynamically determine the hopping pattern and hopping frequency. In several embodiments, the geographical region in which a communications device is deployed or installed, the hardware capabilities of the communications device, and/or other factors, may determine the hopping pattern, hopping frequency, and/or trigger event for hopping between frequencies in the, e.g., 3 GHz bandwidth. Note that embodiments are not limited to a 3 GHz bandwidth and are not limited to a bandwidth in the 6 GHz to 10 GHz frequency bands.

Various embodiments may be designed to address different technical problems associated with transmitting or receiving communications with an increased transmission range across a large bandwidth with a restrictive power spectrum density. Other technical problems may include transmitting or receiving communications with an increased transmission range that comprises a large bandwidth hopping across frequency channels, transmitting or receiving communications with an increased transmission range that comprises a 480 MHz bandwidth hopping across frequency channels totaling 3 GHz in 6 GHz to 10 GHz frequency bands, generating a communication with a contiguous bandwidth of 480 MHz, generating a communication with a non-contiguous bandwidth of 480 MHz, determining the occurrence of a triggering event to hop to another channel, receiving a communication with a contiguous bandwidth of 480 MHz, receiving a communication with a non-contiguous bandwidth of 480 MHz, and/or the like.

Different technical problems such as those discussed above may be addressed by one or more different embodiments. For instance, some embodiments that address transmitting or receiving communications with an increased transmission range across a large bandwidth with a restrictive power spectrum density may do so by one or more different technical means such as transmitting or receiving communications that hop across frequency channels of a large bandwidth in response to trigger events, transmitting or receiving communications with an increased transmission range that hops frequency channels across a large bandwidth such as a 3 GHz bandwidth, generating a communication with a contiguous or non-contiguous bandwidth based upon frequency segments of 80 MHz and/or 160 MHz at different carrier frequencies, determining a channel hopping pattern, hopping channels after each link transmission, hopping channels after a fixed time interval, and/or the like.

Some embodiments implement Institute of Electrical and Electronic Engineers (IEEE) 802.11 systems such as IEEE 802.11ah systems and other systems that operate in accordance with standards such as the IEEE 802.11-2012, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee.org/getieee802/download/802.11-2012.pdf).

Some embodiments are particularly directed to improvements for wireless local area network (WLAN), such as a WLAN implementing one or more Institute of Electrical and Electronics Engineers (IEEE) 802.11 standards (sometimes collectively referred to as "Wi-Fi", or wireless fidelity). In one embodiment, for example, an improved acknowledgement scheme may be implemented for a WLAN such as the IEEE 802.11ah wireless communications standard. The embodiments, however, are not limited to this example.

Several embodiments comprise access points (APs) for and/or client devices of APs or stations (STAs) such as routers, switches, servers, workstations, netbooks, mobile devices (Laptop, Smart Phone, Tablet, and the like), as well as sensors, meters, controls, instruments, monitors, appliances, and the like. Some embodiments may provide, e.g., indoor and/or outdoor "smart" grid and sensor services.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. The one or more antennas may couple with a processor and a radio to transmit and/or receive radio waves. For instance, multiple-input and multiple-output (MIMO) is the use of radio channels carrying signals via multiple antennas at both the transmitter and receiver to improve communication performance.

This disclosure is not limited to WLAN related standards, but may also apply to wireless wide area networks (WWANs) and 3G or 4G wireless standards (including progenies and variants) related to wireless devices, user equipment or network equipment included in WWANs. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA)

system technologies, 3GPP Rel. 8-12 of LTE/System Architecture Evolution (SAE), and so forth. The examples are not limited in this context.

While some of the specific embodiments described below will reference the embodiments with specific configurations, those of skill in the art will realize that embodiments of the present disclosure may advantageously be implemented with other configurations with similar issues or problems.

Turning now to FIG. 1, there is shown an embodiment of a wireless communication system 1000. The wireless communication system 1000 comprises a communications device 1010 that may be wire line and wirelessly connected to a network 1005. The communications device 1010 may communicate wirelessly with a plurality of communication devices 1030, 1050, and 1055 via the network 1005. The communications device 1010 may comprise a station such as a computer, laptop, netbook, smart phone, PDA (Personal Digital Assistant), or other wireless-capable device. The communications device 1030 may comprise a low power communications device such as a consumer electronics device, a personal mobile device, or the like. And communications devices 1050 and 1055 may comprise sensors, stations, access points, hubs, switches, routers, computers, laptops, netbooks, cellular phones, smart phones, PDAs, or other wireless-capable devices. Thus, communications devices may be mobile or fixed.

Initially, the communications device 1030 may determine a frame 1034 to transmit. In some embodiments, the communications device 1030 may receive a data packet and determine to respond with an, e.g., null data packet acknowledgement, and, in other embodiments, the communications device 1030 may determine to contact the communications device 1010 with a probe request, an association request, or the like. The medium access control (MAC) sublayer logic 1038 may communicate with the physical layer (PHY) logic 1039 to transmit the frame 1034 or may provide a MAC frame to the PHY logic 1039 to transmit to the communications device 1010. In many embodiments, the PHY logic 1039 may generate a preamble to prepend to the frame prior to transmitting the MAC frame 1034.

In some embodiments, the MAC sublayer logic 1038 may select a hopping pattern from memory 1032 and instruct the PHY logic 1039 of the selection. In other embodiments, the MAC sublayer logic 1038 may not have control over the hopping pattern because the hopping pattern may be built-into the PHY logic 1039. In some embodiments, the hopping pattern may be selected by hopping logic 1033 of the MAC sublayer logic 1038 or hopping logic 1047 of the PHY logic 1039 and/or may be predetermined at deployment of the device, based upon the installation of the device, based upon the hardware capability of the device or a corresponding receiving device for a particular communication, and/or may be dynamically assigned.

In several embodiments, hopping logic 1033 of the MAC sublayer logic 1038 or hopping logic 1047 of the PHY logic 1039 may determine the frequency of hops associated with the hopping pattern such as the triggering event for hopping to a subsequent channel in the hopping pattern and/or the number of different hops within the hopping pattern. For example, in some embodiments, the communications device 1030 may implement as a trigger event for hopping to a subsequent channel, a link transmission. In some embodiments, the hopping logic 1033 or 1047 may determine that the hopping frequency is to hop after each link transmission. In another embodiment, the hopping logic 1033 or 1047 may determine that the hopping frequency is to hop after every other link transmission. In many embodiments, the frequency of hops may be based upon one or more parameters such as deployment density, transmission range, network frequency reuse factor, and MAC mechanisms.

In other embodiments, the hopping logic 1033 or 1047 may determine that the hopping frequency is to hop after a fixed interval. The fixed interval may be stored in memory 1032 or may be set through beacons or probe responses, association responses, reassociation response, discovery responses, and/or the like. The fixed interval may be a fixed interval of time or may be based upon one or more other factors such as an end of a series of communications. In one embodiment, one or more bits in a preamble or MAC frame may represent a trigger to hop to a subsequent channel for a subsequent communication. In a further embodiment, the hopping pattern and/or frequency may be set in a capabilities indication in a signal (SIG) field of a preamble or in a capabilities field of a MAC frame.

In some embodiments, the packet transmissions may be contiguous and, in further embodiments, the packet transmissions may be non-contiguous. In one embodiment, the packet transmissions may be a 480 megahertz (MHz) bandwidth transmission within a 6 gigahertz (GHz) to 10 GHz frequency band. For contiguous transmissions, the hopping pattern may comprise a single channel in which to transmit a packet such as one of, e.g., six 500 MHz channels within 3 GHz of contiguous bandwidth. In such embodiments, the hopping pattern may indicate a channel to for the entire transmission. In other embodiments, the packet transmissions may be non-contiguous and the hopping pattern may indicate more than one channel in which to transmit a packet.

After instructing the PHY logic 1039 to transmit the packet, the PHY logic 1039 may prepare the packet by, e.g., determining a preamble including a short training field (STF) value, a long training field (LTF) value, and a signal (SIG) field value to transmit as part of a packet. The PHY layer device such as the transmitter of the transceiver (RX/TX) 1040 may then begin processing the packet to transmit to the communications device 1010.

In several embodiments, the packet may be transmitted from module to module through the transmitter of the transceiver (RX/TX) 1040 as a data stream to process the packet in preparation for transmission to the communications device 1010. In many embodiments, after encoding the packet, the communications device 1030 may comprise a frequency segment parser/frequency segment deparser (FSP/FSDP) 1041 to parse the encoded PHY frame into two or more frequency segments. In some embodiments, the frequency segment parser may reside in the transmitter and the frequency segment deparser may reside in the receiver. In further embodiments, the frequency segment parser and deparser may reside in both transmitter and the receiver. For instance, in one embodiment, the frequency segment parser may parse or divide the packet into six frequency segments of 80 MHz bandwidths. An interleaver and a constellation mapper in each branch of the six frequency segments may process each of the six data streams. In some embodiments, such as embodiments designed for non-contiguous bandwidths, the six frequency segments may be processed and transmitted as six different frequency segments with the overall bandwidth of 480 MHz. In several embodiments, the bandwidths may be contiguous or non-contiguous. Note that FSP/FSDP 1021 may perform the same or similar functionality as FSP/FSDP 1041.

In other embodiments that are designed to transmit contiguous bandwidths, the six frequency segments may be deparsed or combined into a single data stream prior to transmission of the 480 MHz bandwidth signal. In some embodiments, the six frequency segments may be deparsed after mapping the data streams to constellations (subcarrier modulation mapping or "modulation") by a constellation mapper and/or deparsed prior to space-time block coding of the data stream. Thereafter, in such embodiments, the data stream may be processed as a single data stream and transmitted as a contiguous, 480 MHz signal.

After the transmitter transmits the 480 MHz bandwidth signal on a first channel in accordance with the hopping pattern, a receiver may detect and receive the signal on the channel. In some embodiments, the first channel in all or many of the hopping patterns may be the same. In other embodiments, the communications device 1030 and the communications device 1010 may determine the first channel based upon the selection of the hopping pattern.

In some embodiments, after receiving the 480 MHz bandwidth signal on a first channel in accordance with the hopping pattern, the hopping logic 1047 of the communications device 1030 and the hopping logic 1028 of the communications device 1010 may determine that the trigger event for hopping to the next channel has occurred and thus the next communication between the communications device 1030 and the communications device 1010 may be on the subsequent channel. In other embodiments, the hopping logic 1047 and 1028 may await or determine the occurrence of a different trigger. For instance, the trigger may be an acknowledgement response received from the communications device 1010 by the communications device 1030. Thus, after the communications device 1010 transmits an acknowledgement, the hopping logic 1028 may ready the transceiver 1020 for receiving another communication on the subsequent channel in accordance with the hopping pattern. Similarly, after receiving the acknowledgement from the communications device 1010, the hopping logic 1047 may determine that the trigger event occurred to advance to the next channel according to the hopping pattern and may ready the transmitter of the transceiver 1040 of the communications device 1030 to transmit on that next communications channel in the hopping pattern.

Figure 1A:
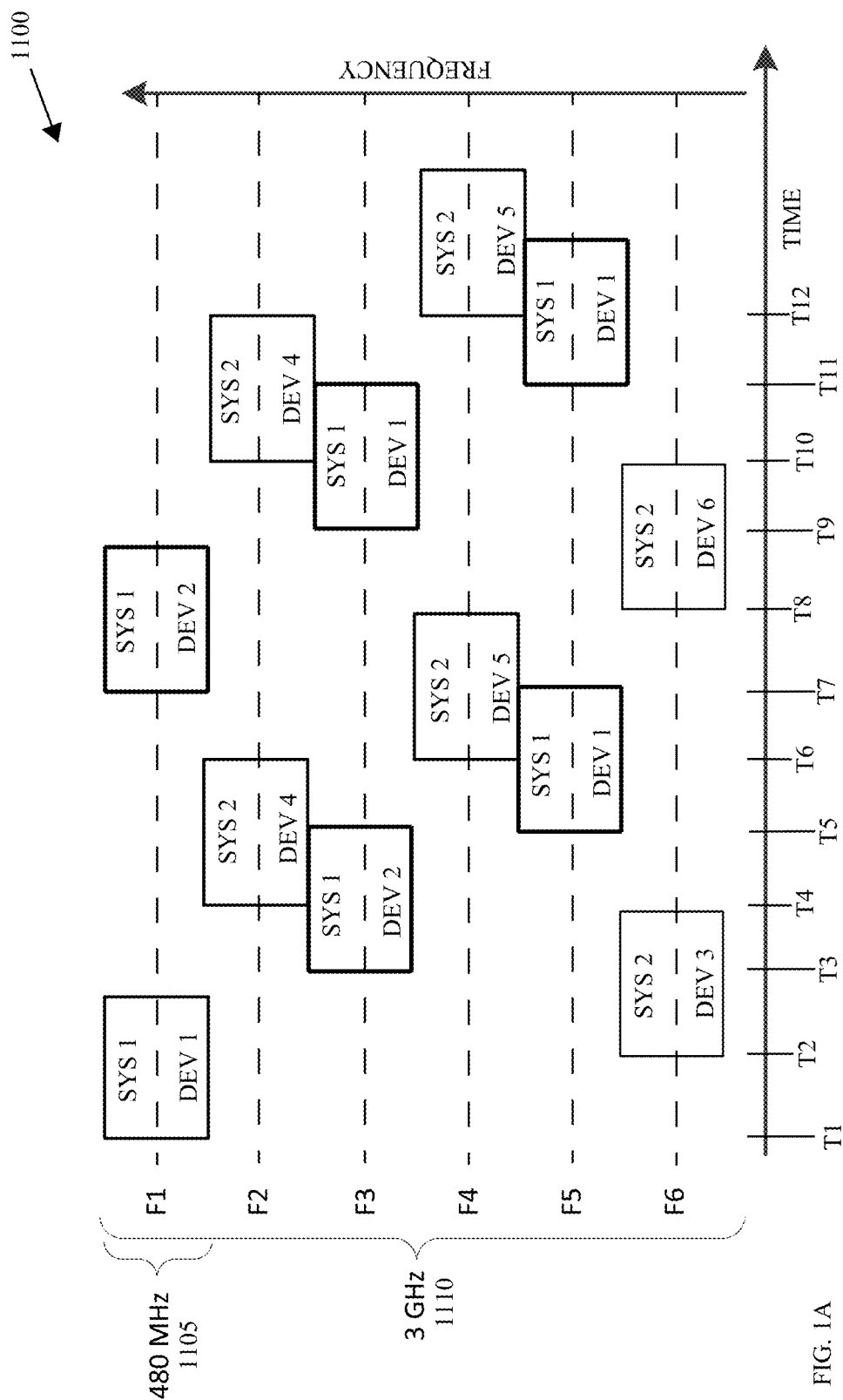
FIG. 1A depicts an embodiment of hopping patterns for multiple systems each with multiple devices for 480 MHz contiguous bandwidth transmissions.

FIG. 1A depicts an embodiment 1100 of hopping patterns for multiple systems each with multiple devices for 480 MHz contiguous bandwidth transmissions. In embodiment 1100 the systems, SYS 1 and SYS 2, are hopping over three 500 MHz spaced channels (F1, F3, and F5). There are a total of 6 channels (F1-F6) for a total system bandwidth of 3 GHz 1110. The spectrum is broke into two different systems (SYS 1 and SYS 2), where each has a fixed set of channels within which to hop. For SYS 1, there are two devices (DEV 1 and DEV 2) that are using that system. For SYS 2, there are 4 devices (DEV 1, DEV 2, DEV 3, and DEV 4) using the 3 other channels. The hopping pattern is not limited to this selection, but this does afford frequency diversity by spanning the largest frequency separation. Additionally, the devices may or may not be setup to transmit immediately after the last device transmitted, which may be determined by the MAC protocol in the MAC sublayer logic. Each of the blocks in the channels F1-F6 represent communications in the channel with a 480 MHz bandwidth 1105 using contiguous 80 or 160 MHz IEEE 802.11ac waveforms.

With regard to SYS 1, the DEV 1 transmits a first packet at time T1 on channel F1. After transmitting the first packet, both the DEV 1 and DEV 2 on SYS 1 determine that the trigger occurred and hop to the subsequent channel, F3, in the hopping pattern. Note that the end of the transmission, whether by transmission or by time interval, is the trigger event in this embodiment for each of the systems and devices.

Thereafter, DEV 2 of SYS 1 transmits a packet at time T3, both DEV 1 and DEV 2 hop to F5 and DEV 1 of SYS 1 transits a packet. The hopping pattern then transitions back to the channel F1 at T7, F3 at T9, and F5 at T11.

The first transmission in SYS 2 is by DEV 3 on channel F6. After that transmission, the devices on SYS 2 hop to channel F2 and DEV 4 transmits a packet. The devices in SYS 2 determine the trigger event of the transmission from DEV 4 and hop to the subsequent channel in their hopping patter, which is the channel F4. And this pattern repeats with the hop to channel F6 at time T8, F2 at time T10, and F4 at time T12. Note that each of the communications devices associated with SYS 2 agree on the same hopping pattern so that they are ready to transmit and receive packets on the appropriate channels. Note also that the embodiment 1100 appears to portray assigned access windows for communications between the devices. In other embodiments, access to the communications medium or channels may be contention based, which may require a little more time to establish and the communications may be variable in length in some embodiments.

Figure 1B:
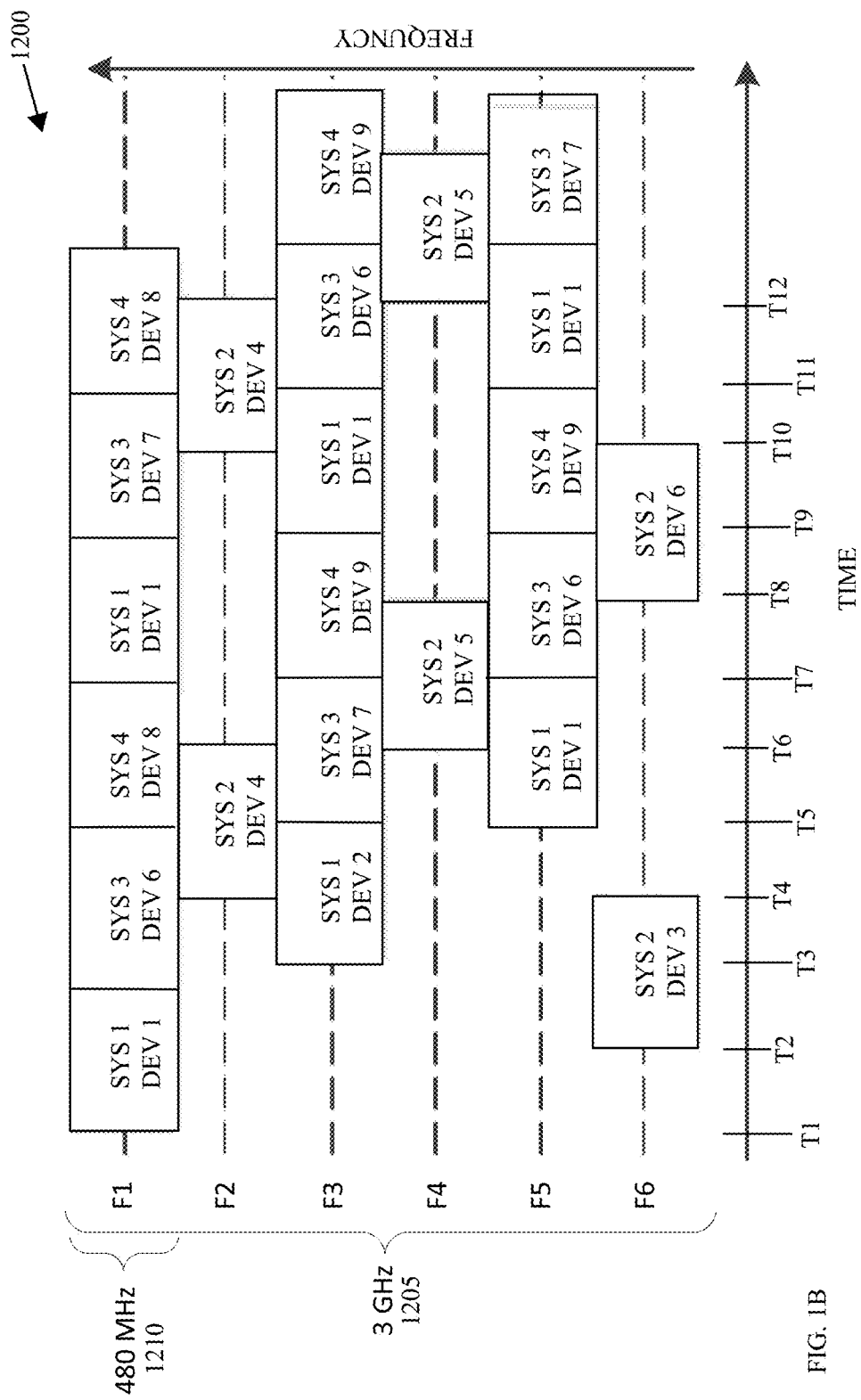
FIG. 1B depicts another embodiment of hopping patterns for multiple systems each with multiple devices for 480 MHz contiguous bandwidth transmissions.

FIG. 1B depicts another embodiment 1200 of hopping patterns for multiple systems each with multiple devices for 480 MHz contiguous bandwidth transmissions 1210. In FIG. 1B, the number of systems and devices is greater than illustrated in FIG. 1A to show a more dense deployment of the devices, and how the channels may be shared. In particular, systems SYS 1, SYS3, and SYS4 share the same hopping pattern (F1, F3, and F5) but are granted access to the channels at difference times. And SYS 2 is implementing a hopping pattern of F6, F2, and F4.

At time T1, DEV 1 on SYS 1 may transmit a packet and, thereafter, both DEV1 and DEV 2 hop to F3 in response to a trigger event associated with the end of the transmission from DEV 1 on SYS 1. At time T3, DEV 2 on SYS 1 may transmit a packet and, thereafter, both DEV1 and DEV 2 hop to F5 in response to a trigger event associated with the end of the transmission from DEV 2 on SYS 1. At time T5, DEV 1 on SYS 1 transmits another packet and the hops continue through F1, F3, and F5.

After DEV 1 on SYS 1 transmits the packet on F1, DEV 6 on SYS 3 transmits a packet on F1 at T3. The devices on SYS 3 determine the trigger event and hop to F3. At time T5, DEV 7 of SYS 3 transmits a packet triggering the next hop to F5 wherein DEV 6 of SYS 3 transmits a packet. SYS 4 follows the same pattern of hops but begins on F1 at T5.

SYS 2 follows a similar pattern in this embodiment 1200 as it did in embodiment 1100 of FIG. 1A and does not, in this embodiment, share the channels F6, F2, and F4 with other devices. Note that this is just for illustration and that traffic on the channels F2, F4, and F6 may become just as dense as or more dense than the traffic illustrated for channels F1, F3, and F5. Also note that in other embodiments, any other hopping pattern is possible and that these are just examples of hopping patterns. For instance, a device may follow a hopping pattern such as (F1, F3, F5, F2, F4, and F6), (F1, F2, F3, F4, F5, and F6), (F1, F2, and F3), (F4, F5, and F6), (F1, F2, F4, and F6), (F1, F1, F3, F3, F5, F5, and F5) and/or any other hopping pattern.

FIG. 1B illustrates more of a time based MAC, but other embodiments may implement a contention based MAC. Further embodiments may implement both time-based and contention based access to the channels at different times such as different portions of a beacon interval, different beacon intervals, and/or the like. For embodiments with a contention-based MAC, each transmission may be variable length, and there may be some time gap between transmissions for contention. Once a system, and specifically a device in a particular system, gains access, the device may transmit on that channel frequency and then all devices on that system may hop to the next frequency and contend there.

Figure 1C:
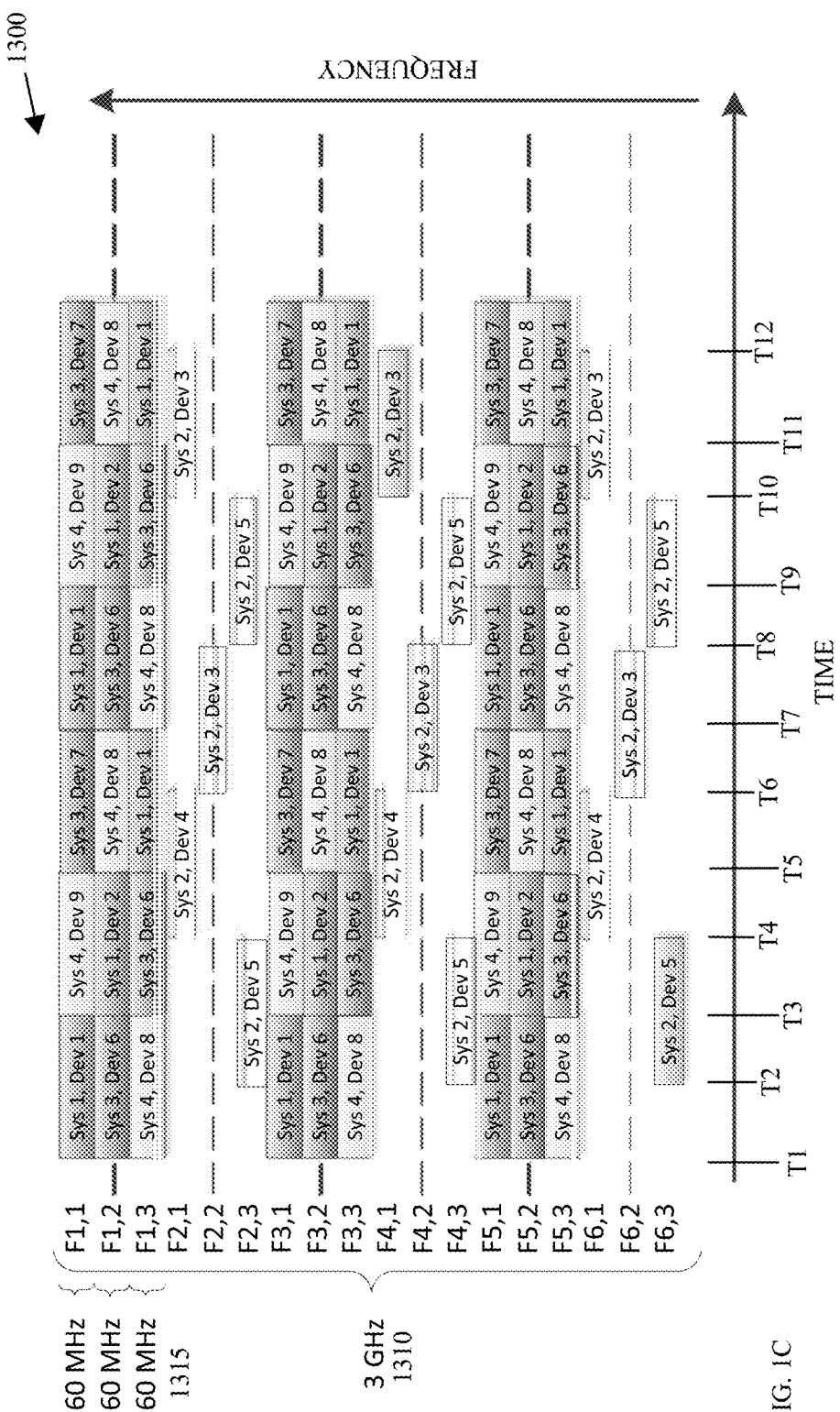
FIG. 1C depicts another embodiment of hopping patterns for multiple systems each with multiple devices for 480 MHz non-contiguous bandwidth transmissions.

FIG. 1C depicts another embodiment 1300 of hopping patterns for multiple systems, each with multiple devices that communicate via 480 MHz non-contiguous bandwidth transmissions. In this embodiment 1300, each device transmits 480 MHz bandwidth using three 160 MHz IEEE 802.11ac waveforms 1315. This approach is not limited to just 160 MHz IEEE 802.11ac waveforms but may also use 80 MHz or other bandwidths. The 160 MHz bandwidths are selected for illustration purposes.

FIG. 1C depicts a more densely utilized system. In this embodiment, the three 160 MHz are transmitted from each device in a non-contiguous fashion. In this system, the 480 MHz bandwidth (500 MHz bandwidth with guard) is subdivided into three 160 MHz channels. So channel F1, illustrated in FIGS. 1A-B, is sub-divided into the subbands or sub-channels F1,1; F1,2; and F1,3. Similarly, the 500 MHz channel F2,1; F2,2; and F2,3 and so on through F6 is subdivided into sub-channels F6,1; F6,2; and F6,3.

In FIG. 1C, at time T1, system 1 device 1 (SYS 1, DEV 1) transmits on non-contiguous channels of F1,1; F3,1; and F5,1. SYS 3, DEV 6, at the same time, transmits on F1,2; F3,2; and F5,2 and then SYS 4, DEV 8 transmits on F1,3; F3,3; and F5,3. Thereafter, each of these systems, SYS 1, SYS 3, and SYS 4 determines that the trigger event has occurred and hops to the next channel, or set of 160 MHz channels in this case. Note that the sub-channels are channels and that "sub" is used above to further describe how the larger channels are divided.

At time T3, system 1 has Device 2 (SYS 1, DEV 2) transmitting, but for this time block SYS 1 hops from F1,1; F3,1; and F5,1 to frequencies of channels F1,2; F3,2; and F5,2. Similarly, SYS 3 and SYS 4 and all their devices hop to their subsequent channels, (F1,3; F3,3, and F5,3) and (F1,1; F3,1; and F5,1), respectively.

At time T5, all the systems and their respective devices hop again to the next sub-band frequency. After 3 hops, the process starts over in the present embodiment. In other embodiments, the number of hops may be more or less and can depend upon a number of different factors, some of which may be specially designed for a particular deployment. SYS 2 illustrates a less complex picture of the sub-band hopping, which, on its first transmission at time T2, operates on F2,3; F4,3; and F6,3. At the next time interval, T4, SYS 2 hops to channels F2,1; F4,1; and F6,1.

Again, in this illustration, the channel hopping using 160 MHz waveforms is shown with a MAC that appears to be scheduled. While this is implemented in some embodiments, embodiments are not limited to that type of MAC protocol. The access assignments illustrations provide a clear picture of how the channel hopping occurs in the hopping patterns and the hopping patterns are more easily viewable than illustrations with the contention based MAC. However, embodiments include the contention-based MAC protocols wherein the devices contend at the appropriate frequency with the other systems on their frequency, then regardless of which device acquires the channel, all those system devices would hop to the next frequency after that transmission. Again, the transmissions may not be as uniform in time as shown in FIGS. 1A-C and there are contention periods between the transmissions.

Note that embodiments that implement the non-contiguous transmissions as illustrated in FIG. 1C can afford improved frequency diversity by spreading the waveform over a larger frequency bandwidth than the contiguous transmissions illustrated in FIGS. 1A and 1B.

Referring again to FIG. 1, the network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, the network 1005 communicatively couples communications devices 1010, 1030, 1050, and 1055.

The communication devices 1010 and 1030 comprise processor(s) 1001 and 1002, memory 1011 and 1031, and MAC sublayer logic 1018 and 1038, respectively. The processor(s) 1001 and 1002 may comprise any data processing device such as a microprocessor, a microcontroller, a state machine, and/or the like, and may execute instructions or code in the memory 1011 and 1031. The memory 1011 and 1031 may comprise a storage medium such as Dynamic Random Access Memory (DRAM), read only memory (ROM), buffers, registers, cache, flash memory, hard disk drives, solid-state drives, or the like. The memory 1011 and 1031 may be coupled with the MAC sublayer logic 1018, 1038 and/or may be coupled with the PHY device, transceiver 1020, 1040, respectively. In many embodiments, the memory 1011 and 1031 may store the frames and/or the frame structures, frame headers or portions thereof, and the memory 1011 and 1031 may store one or more hopping patterns. In many embodiments, the frames may comprise fields based upon the structure of the standard frame structures identified in IEEE 802.11. Note that the memory is shown as a block but may be part of any subcomponent in the communications devices 1010 and 1030. For instance, the memory may be part of or coupled with the PHY logic 1029, 1039 and/or the MAC logic 1018, 1038.

The MAC sublayer logic 1018, 1038 may comprise logic to implement functionality of the MAC sublayer of the data link layer of the communications device 1010, 1030. The MAC sublayer logic 1018, 1038 may generate the frames such as management frames, data frames, and control frames, and may communicate with the PHY logic 1029, 1039. The PHY logic 1029, 1039 may generate physical layer protocol data units (PPDUs) based upon the frames 1014, 1034. More specifically, the frame builders may generate frames 1014, 1034 and the data unit builders of the PHY logic 1029, 1039 may prepend the frames 1014, 1034 with preambles to generate PPDUs for transmission via a physical layer (PHY) device such as the transceivers (RX/TX) 1020 and 1040.

The frame 1014, also referred to as MAC layer Service Data Units (MSDUs), may comprise, e.g., a management frame. For example, a frame builder may generate a management frame such as the beacon frame to identify the communications device 1010 as having capabilities such as supported data rates, power saving features, cross-support, and a service set identification (SSID) of the network to identify the network to the communications device 1030. The MAC sublayer logic 1018 may pass the frame to the PHY logic 1029 and the PHY logic 1029 may prepend a preamble to generate a PHY frame prior to transmitting the PHY frame.

The communications devices 1010, 1030, 1050, and 1055 may each comprise a transmitters and receivers such as transceivers (RX/TX) 1020 and 1040. In many embodiments, transceivers 1020 and 1040 implement orthogonal frequency-division multiplexing (OFDM) 1022, 1042. OFDM 1022, 1042 implements a method of encoding digital data on multiple carrier frequencies. OFDM 1022, 1042 comprises a frequency-division multiplexing scheme used as a digital multi-carrier modulation method. A large number of closely spaced orthogonal subcarrier signals are used to carry data. The data is divided into several parallel data streams or channels, one for each subcarrier. Each subcarrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling. Data tones are used to transfer information between the transmitter and receiver via one of the channels. Pilot tones are used to maintain the channels, and may provide information about time/frequency and channel tracking. And guard tones may help the signal conform to a spectral mask. The nulling of the direct component (DC) may be used to simplify direct conversion receiver designs. And guard intervals may be inserted between symbols such as between every OFDM symbol as well as between the short training field (STF) and long training field (LTF) symbols in the front end of the transmitter during transmission to avoid inter-symbol interference (ISI), which might result from multi-path distortion.

Each transceiver 1020, 1040 comprises a radio 1025, 1045 comprising an RF transmitter and an RF receiver. The RF transmitter comprises an OFDM 1022, which impresses digital data, OFDM symbols encoded with tones, onto RF frequencies, also referred to as subcarriers, for transmission of the data by electromagnetic radiation. In the present embodiment, the OFDM 1022 may impress the digital data as OFDM symbols encoded with tones onto the subcarriers to for transmission. The OFDM 1022 may transform information signals into signals to be applied via the radio 1025, 1045 to elements of an antenna array 1024, 1044. An RF receiver receives electromagnetic energy at an RF frequency and extracts the digital data from the OFDM symbols.

In some embodiments, the communications device 1010 optionally comprises a Digital Beam Former (DBF) 1023, as indicated by the dashed lines. In some embodiments, the DBF 1023 may be part of the OFDM 1022. The DBF 1023 provides spatial filtering and is a signal processing technique used with antenna array 1024 for directional signal transmission or reception. This is achieved by combining elements in a phased antenna array 1024 in such a way that signals at particular angles experience constructive interference while others experience destructive interference. Beamforming can be used at both the transmitting and receiving ends in order to achieve spatial selectivity. The antenna array 1024 is an array of individual, separately excitable antenna elements. The signals applied to the elements of the antenna array 1024 cause the antenna array 1024 to radiate one to four spatial channels. Each spatial channel so formed may carry information to one or more of the communications devices 1030, 1050, and 1055. Similarly, the communications device 1030 comprises the transceiver (RX/TX) 1040 to receive and transmit signals from and to the communications device 1010. The transceiver (RX/TX) 1040 may comprise an antenna array 1044 and, optionally, a DBF 1043.

FIG. 1 may depict a number of different embodiments including a Multiple-Input, Multiple-Output (MIMO) system, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system. In the alternative, FIG. 1 may depict transceivers that include multiple antennas and that may be capable of multiple-user MIMO (MU-MIMO) operation.

Figure 2:
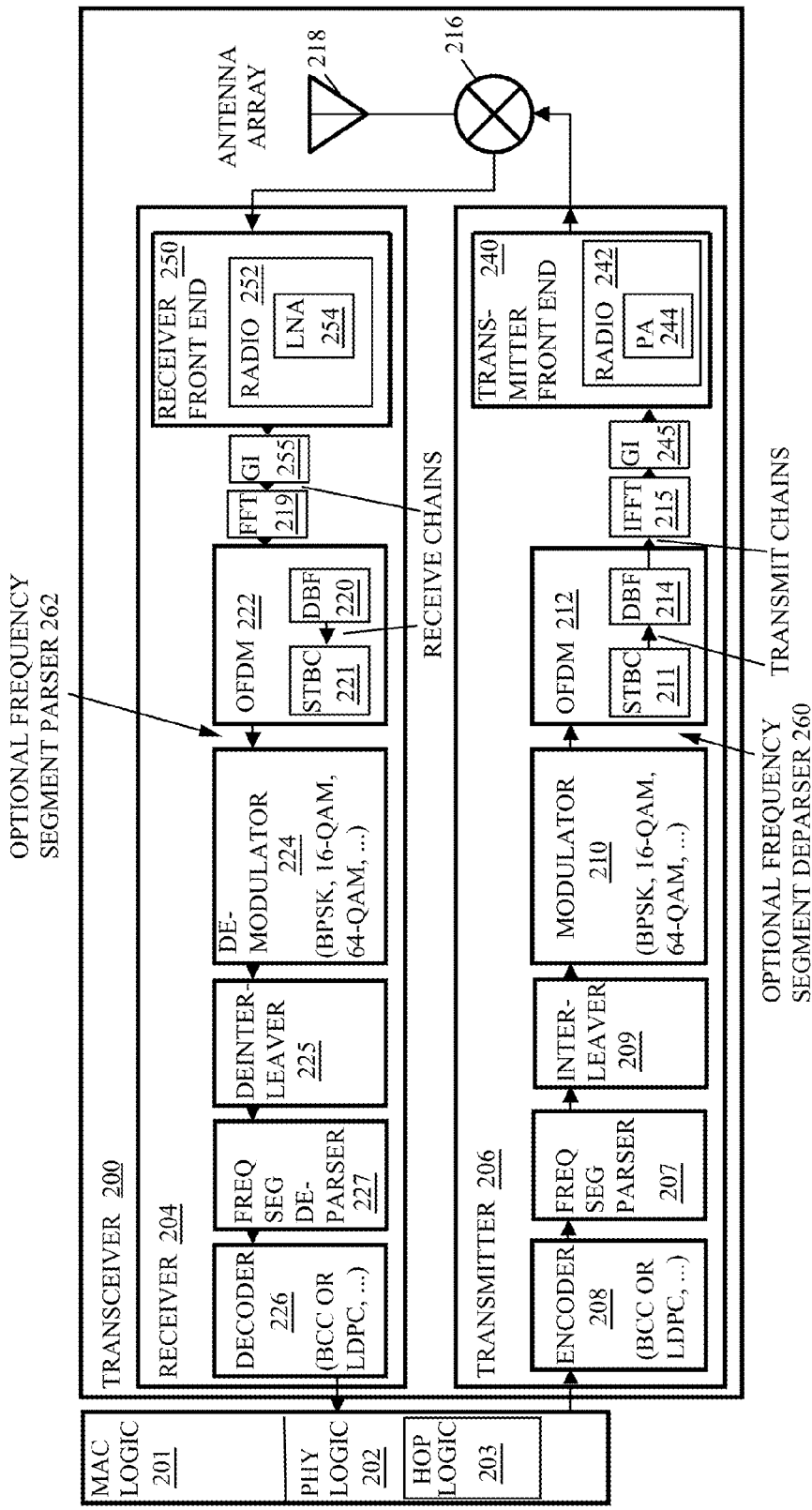
FIG. 2 depicts an embodiment of an apparatus to generate, transmit, receive, decode, and interpret large bandwidth communications.

FIG. 2 depicts an embodiment of an apparatus to generate, transmit, receive, and interpret or decode MAC frames. The apparatus comprises a transceiver 200 coupled with Medium Access Control (MAC) sublayer logic 201 and a physical layer (PHY) logic 202. The MAC sublayer logic 201 may determine a frame and the physical layer (PHY) logic 202 may determine the PPDU by prepending the frame or multiple frames, also called MAC protocol data units (MP-DUs), with a preamble to transmit via transceiver 200. For example, a frame builder may generate a frame including a type field that specifies the type of the frame such as a management, control, or data frame. A control frame may include a Ready-To-Send or Clear-To-Send frame. A management frame may comprise a Beacon, Probe Request/Response, Association Request/Response, and Reassociation Request/Response frame type. And the data type frame is designed to transmit data.

In the present embodiment, the PHY logic 202 may comprise the hopping logic 203. The hopping logic 203 may implement a pattern of channel hops in response to trigger events such as a fixed time interval or an end of a transmission. In many embodiments, the hopping logic 203 may comprise a pattern of channels in an order that determines an order in which the frequencies of the transmissions and receptions will occur. In some embodiments, the transceiver 200 may either transmit contiguous transmissions or non-contiguous transmissions so the hopping logic 203 may only include the one that corresponds to the hardware configuration. In further embodiments, the transceiver 200 may be capable of both contiguous and non-contiguous transmissions and the hopping logic 203, in such embodiments, may include hopping patterns for both contiguous and non-contiguous transmissions.

In several embodiments, the hopping logic 203 may include logic to agree to and/or to negotiate a hopping pattern with another communications device. In some embodiments, the hopping logic 203 may receive an indication of a capability from another communications device and select a particular hopping pattern based upon one or more factors such as preference indicated for a particular hopping pattern if available, an indication of deployment type, an indication of traffic density on one or more particular channels, a preference presented by the other communications device, and/or the like.

The transceiver 200 comprises a receiver 204 and a transmitter 206. The transmitter 206 may comprise one or more of an encoder 208, a frequency segment parser 207, an interleaver 209, a modulator 210, optionally a frequency segment deparser 260, an OFDM 212, an 215, a GI 245, and a transmitter front end 240. The encoder 208 of transmitter 206 receives and encodes a data stream destined for transmission from the MAC sublayer logic 202 with, e.g., a binary convolutional coding (BCC), a low density parity check coding (LDPC), and/or the like. The frequency segment parser 207 may receive data stream from encoder 208 and parse the data stream into two or more frequency segments to build a contiguous or non-contiguous bandwidth based upon building blocks of frequency segments that have smaller bandwidths. For instance, the frequency segment parser 207 may separate the data stream into three frequency segments including two frequency segments with 160 MHz bandwidths and one frequency segment with an 80 MHz bandwidth. The interleaver 209 may have three separate data processing paths to interleave the three frequency segments separately to prevent long sequences of adjacent noisy bits from entering a BCC decoder of a receiver.

The modulator 210 may receive the three data streams from interleaver 209 and may impress the received data blocks onto a sinusoid of a selected frequency for each stream via, e.g., mapping the data blocks into a corresponding set of discrete amplitudes of the sinusoid, or a set of discrete phases of the sinusoid, or a set of discrete frequency shifts relative to the frequency of the sinusoid. In some embodiments, the output of modulator 209 may be fed into the optional frequency segment deparser 260. In these embodiments, the transmitter 206 may be configured to transmit the, e.g., three frequency segments in a single, contiguous frequency bandwidth of, e.g., 400 MHz. Other embodiments may continue to process the three frequency segments as three separate data streams.

After the modulator 210, the data stream(s) are fed to an orthogonal frequency division multiplexing (OFDM) module 212. The OFDM module 212 may comprise a space-time block coding (STBC) module 211, and a digital beamforming (DBF) module 214. The STBC module 211 may receive constellation points from the modulator 209 corresponding to one or more spatial streams and may spread the spatial streams to a greater number of space-time streams (also generally referred to as data streams). Further embodiments may omit the STBC.

The OFDM module 212 impresses or maps the modulated data formed as OFDM symbols onto a plurality of orthogonal subcarriers so the OFDM symbols are encoded with the subcarriers or tones. In some embodiments, the OFDM symbols are fed to the Digital Beam Forming (DBF) module 214. Generally, digital beam forming uses digital signal processing algorithms that operate on the signals received by, and transmitted from, an array of antenna elements.

The Inverse Fast Fourier Transform (IFFT) module 215 may perform an inverse discrete Fourier transform (IDFT) on the OFDM symbols to map the subcarriers to each of the, e.g., three contiguous or non-contiguous frequency bandwidths. The output of the IFFT module 215 may enter the guard interval (GI) module 245. The GI module 245 may insert guard intervals by prepending to the symbol a circular extension of itself. In some embodiments, the GI module 245 may also comprise windowing to optionally smooth the edges of each symbol to increase spectral decay.

The output of the GI module 245 may enter the transmitter front end 240. The transmitter front end 240 may comprise a radio 242 with a power amplifier (PA) 244 to amplify the signal and prepare the signal for transmission via the antenna array 218.

In one embodiment, the radio 242, 252 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. The radio 242, 252 may include, for example, a receiver, a transmitter and/or a frequency synthesizer. The radio 242, 252 may include, for instance, bias controls, and a crystal oscillator, and may couple with one or more antennas 218. In another embodiment, the radio 242 may use external voltage-controlled oscillators (VCOs), surface acoustic wave filters, intermediate frequency (IF) filters and/or RF filters, as desired. Due to the variety of potential RF interface designs an expansive description thereof is omitted.

The signal may be up-converted to a higher carrying frequency or may be performed integrally with up-conversion. Shifting the signal to a much higher frequency before transmission enables use of an antenna array of practical dimensions. That is, the higher the transmission frequency, the smaller the antenna can be. Thus, an up-converter multiplies the modulated waveform by a sinusoid to obtain a signal with a carrier frequency that is the sum of the central frequency of the waveform and the frequency of the sinusoid.

The transceiver 200 may also comprise duplexers 216 connected to antenna array 218. Thus, in this embodiment, a single antenna array is used for both transmission and reception. When transmitting, the signal passes through duplexers 216 and drives the antenna with the up-converted information-bearing signal. During transmission, the duplexers 216 prevent the signals to be transmitted from entering receiver 204. When receiving, information bearing signals received by the antenna array pass through duplexers 216 to deliver the signal from the antenna array to receiver 204. The duplexers 216 then prevent the received signals from entering transmitter 206. Thus, duplexers 216 operate as switches to alternately connect the antenna array elements to the receiver 204 and the transmitter 206.

The antenna array 218 radiates the information bearing signals into a time-varying, spatial distribution of electromagnetic energy that can be received by an antenna of a receiver. The receiver can then extract the information of the received signal. In other embodiments, the transceiver 200 may comprise one or more antennas rather than antenna arrays and, in several embodiments, the receiver 204 and the transmitter 206 may comprise their own antennas or antenna arrays.

The transceiver 200 may comprise a receiver 204 for receiving, demodulating, and decoding information bearing communication signals. The receiver 204 may comprise a receiver front-end to detect the signal, detect the start of the packet, remove the carrier frequency, and amplify the subcarriers via a radio 252 with a low noise amplifier (LNA) 254. The receiver 204 may comprise a GI module 255 and a fast Fourier transform (FFT) module 219. The GI module 255 may remove the guard intervals and the windowing and the FFT module 219 may transform the communication signals from the time domain to the frequency domain.

The receiver 204 may also comprise an OFDM module 222, an optional frequency segment parser 262, a demodulator 224, a deinterleaver 225, a frequency segment deparser 227, and a decoder 226. An equalizer may output the weighted data signals for the OFDM packet to the OFDM module 222. The OFDM 222 extracts signal information as OFDM symbols from the plurality of subcarriers onto which information-bearing communication signals are modulated.

The OFDM module 222 may comprise a DBF module 220, and an STBC module 221. The received signals are fed from the equalizer to the DBF module 220. The DBF module 220 may comprise algorithms to process the received signals as a directional transmission directed toward to the receiver 204. And the STBC module 221 may transform the data streams from the space-time streams to spatial streams.

The output of the STBC module 221 may enter a frequency segment parser 262 if the communication signal is received as a single, contiguous bandwidth signal to parse the signal into, e.g., two or more frequency segments for demodulation and deinterleaving. On the other hand, if the communication is received as three separate bandwidth signals then the signals may be demodulated and deinterleaved prior to deparsing the signals.

The demodulator 224 demodulates the spatial streams. Demodulation is the process of extracting data from the spatial streams to produce demodulated spatial streams. The method of demodulation depends on the method by which the information is modulated onto the received carrier signal and such information is included in the transmission vector (TXVECTOR) included in the communication signal. Thus, for example, if the modulation is BPSK, demodulation involves phase detection to convert phase information to a binary sequence. Demodulation provides to the deinterleaver 225 a sequence of bits of information.

The deinterleaver 225 may deinterleave the sequence of bits of information. For instance, the deinterleaver 225 may store the sequence of bits in columns in memory and remove or output the bits from the memory in rows to deinterleave the bits of information. In many embodiments, the frequency segment deparser 227 may deparse the frequency segments as received if received as separate frequency segment signals, or may deparse the frequency segments determined by the optional frequency segment parser 262. The decoder 226 decodes the deparsed and deinterleaved data from the demodulator 224 and transmits the decoded information, the MPDU, to the MAC sublayer logic 202.

Persons of skill in the art will recognize that a transceiver may comprise numerous additional functions not shown in FIG. 2 and that the receiver 204 and transmitter 206 can be distinct devices rather than being packaged as one transceiver. For instance, embodiments of a transceiver may comprise a Dynamic Random Access Memory (DRAM), a reference oscillator, filtering circuitry, synchronization circuitry, an interleaver and a deinterleaver, possibly multiple frequency conversion stages and multiple amplification stages, etc. Further, some of the functions shown in FIG. 2 may be integrated. For example, digital beam forming may be integrated with orthogonal frequency division multiplexing.

The MAC sublayer logic 201 may parse the MPDU based upon a format defined in the communications device for a frame to determine the particular type of frame by determining the type value and the subtype value. The MAC sublayer logic 201 may then parse and interpret the remainder of MPDU based upon the definition for the frame of the particular type and subtype indicated in the MAC header.

Figure 3A:
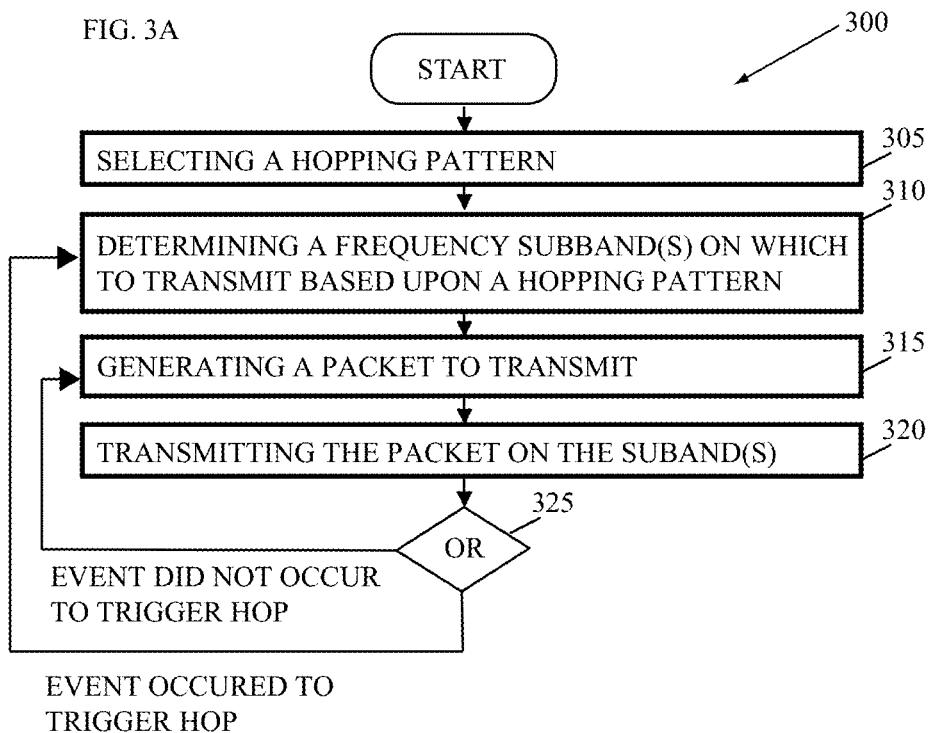
FIGS. 3A-B depict embodiments of flowcharts to transmit and receive packets in accordance with a hopping pattern.
Figure 3B:
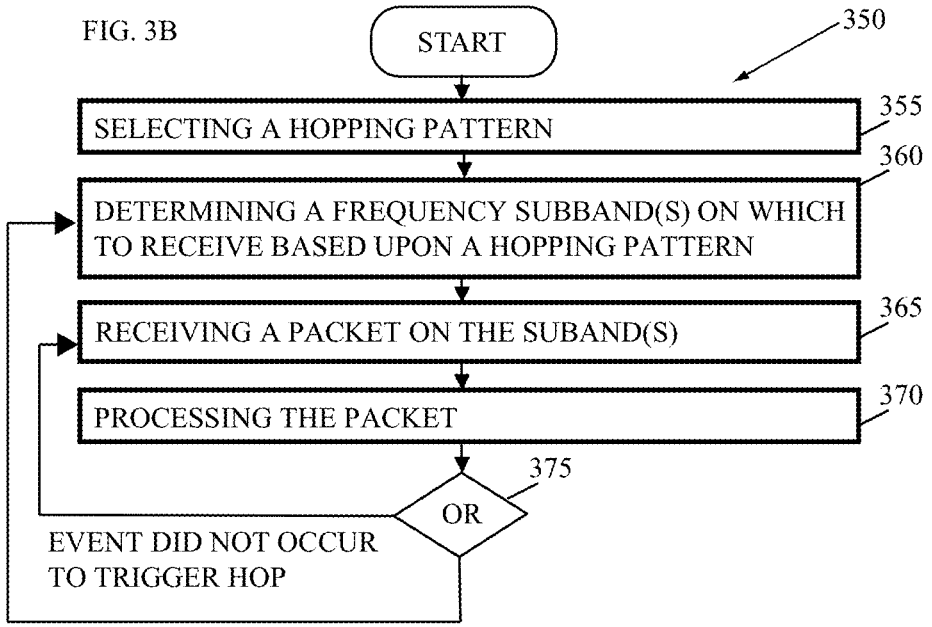

FIG. 3A-B depict embodiments of flowcharts to transmit and receive packets in accordance with a hopping pattern. In particular, FIG. 3A depicts an embodiment of a flowchart 300 to transmit packets. The flowchart 300 begins with a medium access control (MAC) sublayer logic or PHY logic selecting a hopping pattern (element 305). In some embodiments, the MAC sublayer logic may interact with a receiver, determine a traffic density, determine a deployment preference, and/or the like to determine a hopping pattern. In further embodiments, the MAC sublayer logic may select the hopping pattern from one or more predetermined hopping patterns that the PHY is capable of implementing. In further embodiments, the PHY may choose a hopping pattern and the MAC may choose a hop frequency associated with the hopping pattern. In still other embodiments, the PHY logic may choose the hopping pattern and the hop frequency. In many embodiments, the hopping pattern may represent a pattern of channels in a 6 gigahertz to 10 gigahertz frequency band to which to hop in response to a trigger event.

After determining the hopping pattern, the PHY logic or MAC sublayer logic may determine the frequency subband, or channel, on which to transmit a packet (element 310). In many embodiments, the hopping pattern may indicate the first frequency on which to start transmitting. Thereafter, the embodiments may select the subsequent channel in response to determining an occurrence of a trigger event. In several embodiments, the PHY logic or MAC sublayer logic may count a number of trigger events and the number may be the index within the hopping pattern of the channel on which to transmit the subsequent transmission. In some embodiments, the occurrence of a triggering event coincides with the completion of a transmission by the device or another device in the same system. In some embodiments, the occurrence of a triggering event coincides with the expiration of a time interval. In some embodiments, determining the frequency subband, or channel, may comprise determining a channel for each of more than one non-contiguous portions of the packet transmission or determining a channel for a contiguous bandwidth transmission.

After, during, or before determining the subband on which to transmit the packet, the transmitter may generate the packet (element 315). In some embodiments, generating the packet may involve receiving a MAC frame from the MAC sublayer logic to transmit and prepending a preamble with at least one short training field, at least one long training field, and a signal field. In further embodiments, generating the packet to transmit may comprise generating a packet without a MAC frame as a payload.

After generating the packet to transmit, the PHY device may transmit the packet as a data stream through a series of processing modules to process the packet for transmission. To prepare the data stream for transmission, the data stream may be padded with bits to provide an integer number of modulated symbols in each OFDM symbol and scrambled to reduce the probability of long sequences of zeros or ones.

The PHY device may then encode the packet with, e.g., a Binary Convolutional Codes (BCC) and parse the encoded packet to determine two or more frequency segments. For example, a transmitter may be designed to build a large bandwidth communication from a packet by parsing the packet into six frequency segments. Each frequency segment may be a fundamental building block for that receiver such as a 160 MHz bandwidth frequency segment. In some embodiments, all six segments may be used to generate the large bandwidth signal each time a packet is transmitted. In other embodiments, the number of frequency segments, and thus the bandwidth of the transmission, may be dynamically selectable.

An interleaver and modulator may interleave and modulate the data streams in each of the frequency segments. In many embodiments, if the PHY device is designed for transmission of a contiguous bandwidth, the PHY device may include a frequency segment deparser after the modulator to combine the six frequency segments into a single data stream prior to transmission. In other embodiments, the PHY device may not include a frequency segment deparser. The PHY device may finish processing the packet through the inverse discrete Fourier transform and other modules and transmit the packet (element 320).

If the device determines (element 325) that a trigger event occurred then the MAC logic or PHY logic may determine that the trigger event occurred and may select the subsequent frequency in the hopping pattern at element 310. On the other hand, if the device determines (element 325) that the trigger event did not occur, the device may generate (element 315) and transmit (element 320) the next packet on the current channel.

FIG. 3B depicts an embodiment of a flowchart 350 to receive, decode, parse and interpret, or otherwise determine a frame. The flowchart 350 begins with a medium access control (MAC) sublayer logic or PHY logic selecting a hopping pattern (element 355). In some embodiments, the PHY logic may receive an indication of a preferred a hopping pattern from the transmitter or an indication of a list of hopping patterns available in the transmitter and may select a hopping pattern based upon the one or more indications from the transmitter. In further embodiments, the MAC sublayer logic or PHY logic may select the hopping pattern from one or more predetermined hopping patterns that the PHY is capable of implementing.

After determining the hopping pattern, the PHY logic or MAC sublayer logic may determine the frequency subband, or channel, on which to transmit a packet (element 360). In many embodiments, the hopping pattern may indicate the first frequency on which to start transmitting so the receiver may hop the first frequency and prepare to receive a transmission from the transmitter. Thereafter, the embodiments may select the subsequent channel in response to determining an occurrence of a trigger event. In several embodiments, the PHY logic or MAC sublayer logic may determine the occurrence of the trigger event based upon, e.g., the completion of a link transmission or the expiration of a fixed time period.

After determining the hopping pattern, the receiver may receive a communication that includes a packet (element 365). The PHY logic may detect the communication by detection of an energy level at the receiver front end and, in response, begin processing the incoming OFDM packet. In some embodiments, the communication may include multiple non-contiguous bandwidth transmissions. In other embodiments, the communication may include a large contiguous bandwidth transmission such as a transmission with a bandwidth that is greater than 160 MHz.

After receiving the communication, the receiver may begin processing the transmission as, e.g., two or more non-contiguous bandwidth signals or one or two or more contiguous bandwidth transmissions (element 370). If the received transmission is a large contiguous bandwidth transmission, the receiver may parse the transmission into two or more frequency segments and proceed to demodulating and deinterleaving the transmission. On the other hand, if the transmission is received as two or more non-contiguous transmissions, the receiver may proceed to demodulating and deinterleaving the transmission.

After demodulating and deinterleaving, the receiver may deparse the frequency segments to generate a single data stream with the combined data from the two or more frequency segments. The receiver may then decode the packet, descramble the packet, remove the bit padding, and transmit the payload of the packet, if any, to the MAC logic to parse and interpret.

After processing the packet, the MAC logic or PHY logic may determine if a trigger event occurred to determine whether or not to advance to a subsequent channel or set of non-contiguous channels (element 375). If the trigger event did not occur then the receive may return to a ready to receive mode. On the other hand, if the trigger event did occur then the receiver may determine the frequency on which to receive based upon the hopping pattern (element 360) to await a subsequent transmission from the transmitter or another transmitter.

FIGS. 4A-B depict embodiments of flowcharts 400 and 450 to transmit, receive, and interpret communications with a frame. Referring to FIG. 4A, the flowchart 400 may begin with receiving a frame from the frame builder. The MAC sublayer logic of the communications device may select a channel on which to transmit a packet based upon a hopping pattern and may generate the frame as a management frame to transmit to an access point and may pass the frame as an MAC protocol data unit (MPDU) to a data unit builder that transforms the data into a packet that can be transmitted to the access point. The data unit builder may generate a preamble to prepend the PHY service data unit (PSDU) (the MPDU from the frame builder) to form a PHY protocol data unit (PPDU) for transmission (element 405). In some embodiments, more than one MPDU may be prepended in a PPDU.

The PPDU may then be transmitted to the physical layer device such as the transmitter 206 in FIG. 2 or the transceiver 1020, 1040 in FIG. 1 so the PPDU may be parsed into two or more frequency segments associated with contiguous or non-contiguous bandwidths and converted to communication signals (element 410). The transmitter may then transmit the communication signals via one or more antennas or an antenna array (element 415).

Referring to FIG. 4B, the flowchart 450 begins with a receiver of an access point such as the receiver 204 in FIG. 2 receiving a communication signal via one or more antenna(s) such as an antenna element of antenna array 218 (element 455) on a channel indicated by a hopping pattern for the system in which the receiver is associated. The receiver may deparse the frequency segments of the communications signal and may convert the communication signal into an MPDU in accordance with the process described in the preamble (element 460). More specifically, the received signal is fed from the one or more antennas to a DBF such as the DBF 220. The DBF processes the signal with spatial selectivity based on the direction of receipt. The output of the DBF is fed to OFDM such as the OFDM 222. In some embodiments, the output may first be fed into a frequency parser to parse the communication signal into two or more frequency segments.

The OFDM may extract signal information from the plurality of subcarriers in each of the frequency segments onto which information-bearing signals are modulated. Then, the demodulator such as the demodulator 224 demodulates the signal information via, e.g., BPSK, 16-QAM, 64-QAM, 256-QAM, QPSK, or SQPSK. The signal may be deinterleaved and the frequency segments may then be deparsed.

The decoder such as the decoder 226 may decode the signal information from the demodulator via, e.g., BCC or LDPC, to extract the MPDU (element 460) and transmit the MPDU to MAC sublayer logic such as MAC sublayer logic 202 (element 465).

The MAC sublayer logic may determine frame field values from the MPDU (element 470) the frame control field. For instance, the MAC sublayer logic may determine frame field values such as the ACK policy field value of the frame.

The following examples pertain to further embodiments. One example comprises an apparatus to transmit packets. The apparatus may comprise a physical layer logic to determine a hopping pattern, the hopping pattern to indicate a pattern of channels in a 6 gigahertz to 10 gigahertz frequency band to which to hop in response to a trigger event; and a physical layer device coupled with the physical layer logic to transmit at least part of a first packet on a first channel indicated by the hopping pattern by generation of a transmission having a bandwidth of at least 480 megahertz to transmit the first packet; and transmit at least part of a second packet on a second channel indicated by the hopping pattern in response to an occurrence of the trigger event.

In some embodiments, the apparatus may further comprise a processor, a memory coupled with the processor, a radio coupled with the physical layer device, and one or more antennas coupled with the radio to transmit the packets. In some embodiments, the physical layer device is configured to transmit the at least part of the first packet on the first channel and a remainder of the first packet on one or more other channels, wherein the at least the 480 megahertz bandwidth transmission is non-contiguous. In some embodiments, the physical layer device is configured to transmit the first packet on the first channel as a contiguous, 480 megahertz bandwidth transmission. In some embodiments, the physical layer device is configured to hop to the second channel in the hopping pattern after a link transmission of the first packet or after a fixed interval.

Another embodiment comprises a method to transmit packets. The method may comprise determining a hopping pattern, the hopping pattern to indicate a pattern of channels in a 6 gigahertz to 10 gigahertz frequency band to which to hop in response to a trigger event; transmitting at least part of a first packet on a first channel indicated by the hopping pattern by generating a transmission having a bandwidth of at least 480 megahertz to transmit the first packet; and transmitting at least part of a second packet on a second channel indicated by the hopping pattern in response to an occurrence of the trigger event.

In some embodiments, transmitting the at least part of the first packet on a first channel comprises transmitting part of the first packet on the first channel, wherein the at least the 480 megahertz bandwidth transmission is non-contiguous. In some embodiments, transmitting the at least part of the first packet on a first channel comprises transmitting the first packet on the first channel as a contiguous, 480 megahertz bandwidth transmission. In some embodiments, transmitting at least part of a second packet on a second channel comprises hopping to the second channel in the hopping pattern after a link transmission of the first packet or after a fixed interval.

Another embodiment comprises a system to transmit packets. The system may comprise a processor; a memory coupled with the processor; a physical layer logic to determine a hopping pattern, the hopping pattern to indicate a pattern of channels in a 6 gigahertz to 10 gigahertz frequency band to which to hop in response to a trigger event; and a physical layer device coupled with the physical layer logic to transmit at least part of a first packet on a first channel indicated by the hopping pattern by generation of a transmission having a bandwidth of at least 480 megahertz to transmit the first packet; and transmit at least part of a second packet on a second channel indicated by the hopping pattern in response to an occurrence of the trigger event; and one or more antennas coupled with the radio to transmit the packets.

In some embodiments, the physical layer device is configured to transmit the at least part of the first packet on the first channel and a remainder of the first packet on one or more other channels, wherein the at least the 480 megahertz bandwidth transmission is non-contiguous. In some embodiments, the physical layer device is configured to transmit the first packet on the first channel as a contiguous, 480 megahertz bandwidth transmission. In some embodiments, the physical layer device is configured to hop to the second channel in the hopping pattern after a link transmission of the first packet or after a fixed interval.

Another embodiment comprises an apparatus to receive packets. The apparatus may comprise a physical layer logic to determine a hopping pattern, the hopping pattern to indicate a pattern of channels in a 6 gigahertz to 10 gigahertz frequency band to which to hop in response to a trigger event; and a physical layer device coupled with the physical layer logic to receive at least part of a first packet on a first channel indicated by the hopping pattern via at least a 480 megahertz bandwidth transmission; and to receive at least part of a second packet on a second channel indicated by the hopping pattern in response to an occurrence of the trigger event.

In some embodiments, the apparatus may further comprise a processor, a memory coupled with the processor, a radio coupled with the physical layer device, and one or more antennas coupled with the radio to receive the packets. In some embodiments, the physical layer device is configured to receive the at least part of the first packet on the first channel and a remainder of the first packet on one or more other channels, wherein the at least the 480 megahertz bandwidth transmission is non-contiguous. In some embodiments, the physical layer device is configured to receive the first packet on the first channel as a contiguous, 480 megahertz bandwidth transmission. In some embodiments, the physical layer device is configured to hop to the second channel in the hopping pattern after a link transmission of the first packet or after a fixed interval.

Another embodiment comprises a system to receive packets. The system may comprise a processor; a memory coupled with the processor; a physical layer logic to determine a hopping pattern, the hopping pattern to indicate a pattern of channels in a 6 gigahertz to 10 gigahertz frequency band to which to hop in response to a trigger event; and a physical layer device coupled with the physical layer logic to receive at least part of a first packet on a first channel indicated by the hopping pattern via at least a 480 megahertz bandwidth transmission; and to receive at least part of a second packet on a second channel indicated by the hopping pattern in response to an occurrence of the trigger event; a radio coupled with the communication; and one or more antennas coupled with the radio to transmit the communication.

In some embodiments, the physical layer device is configured to receive the at least part of the first packet on the first channel and a remainder of the first packet on one or more other channels, wherein the at least the 480 megahertz bandwidth transmission is non-contiguous. In some embodiments, the physical layer device is configured to receive the first packet on the first channel as a contiguous, 480 megahertz bandwidth transmission. In some embodiments, the physical layer device is configured to hop to the second channel in the hopping pattern after a link transmission of the first packet or after a fixed interval.

Another embodiment comprises a method to receive packets. The method may comprise determining a hopping pattern, the hopping pattern to indicate a pattern of channels in a 6 gigahertz to 10 gigahertz frequency band to which to hop in response to a trigger event; receiving at least part of a first packet on a first channel indicated by the hopping pattern via at least a 480 megahertz bandwidth transmission; and receiving at least part of a second packet on a second channel indicated by the hopping pattern in response to an occurrence of the trigger event.

In some embodiments, receiving the at least part of the first packet on a first channel comprises receiving the at least part of the first packet on the first channel and a remainder of the first packet on one or more other channels, wherein the at least the 480 megahertz bandwidth transmission is non-contiguous. In some embodiments, receiving the at least part of the first packet on a first channel comprises receiving the first packet on the first channel as a contiguous, 480 megahertz bandwidth transmission. In some embodiments, receiving at least part of a second packet on a second channel comprises hopping to the second channel in the hopping pattern after a link transmission of the first packet or after a fixed interval.

Another embodiment comprises an apparatus to transmit packets. The apparatus may comprise a means for determining a hopping pattern, the hopping pattern to indicate a pattern of channels in a 6 gigahertz to 10 gigahertz frequency band to which to hop in response to a trigger event; a means for transmitting at least part of a first packet on a first channel indicated by the hopping pattern by generating a transmission having a bandwidth of at least 480 megahertz to transmit the first packet; and a means for transmitting at least part of a second packet on a second channel indicated by the hopping pattern in response to an occurrence of the trigger event.

In some embodiments, the means for transmitting the at least part of the first packet comprises a means for transmitting the at least part of the first packet on the first channel and a remainder of the first packet on one or more other channels, wherein the at least the 480 megahertz bandwidth transmission is non-contiguous. In some embodiments, the means for transmitting the at least part of the first packet comprises a means for transmitting the first packet on the first channel as a contiguous, 480 megahertz bandwidth transmission. In some embodiments, the means for transmitting at least part of a second packet comprises a means for hopping to the second channel in the hopping pattern after a link transmission of the first packet or after a fixed interval.

Another embodiment comprises an apparatus to receive packets. The apparatus may comprise a means for determining a hopping pattern, the hopping pattern to indicate a pattern of channels in a 6 gigahertz to 10 gigahertz frequency band to which to hop in response to a trigger event; a means for receiving at least part of a first packet on a first channel indicated by the hopping pattern via at least a 480 megahertz bandwidth transmission; and a means for receiving at least part of a second packet on a second channel indicated by the hopping pattern in response to an occurrence of the trigger event.

In some embodiments, the means for receiving the at least part of the first packet on a first channel comprises a means for receiving the at least part of the first packet on the first channel and a remainder of the first packet on one or more other channels, wherein the at least the 480 megahertz bandwidth transmission is non-contiguous. In some embodiments, the means for receiving the at least part of the first packet on a first channel comprises a means for receiving the first packet on the first channel as a contiguous, 480 megahertz bandwidth transmission. In some embodiments, the means for receiving at least part of a second packet on a second channel comprises a means for hopping to the second channel in the hopping pattern after a link transmission of the first packet or after a fixed interval.

Another embodiment comprises one or more tangible computer-readable non-transitory storage media comprising computer-executable instructions operable to, when executed by at least one computer processor, enable the at least one computer processor to implement a method. The method may comprise determining a hopping pattern, the hopping pattern to indicate a pattern of channels in a 6 gigahertz to 10 gigahertz frequency band to which to hop in response to a trigger event; transmitting at least part of a first packet on a first channel indicated by the hopping pattern by generating a transmission having a bandwidth of at least 480 megahertz to transmit the first packet; and transmitting at least part of a second packet on a second channel indicated by the hopping pattern in response to an occurrence of the trigger event.

In some embodiments, transmitting the at least part of the first packet on a first channel comprises transmitting part of the first packet on the first channel, wherein the at least the 480 megahertz bandwidth transmission is non-contiguous. In some embodiments, transmitting the at least part of the first packet on a first channel comprises transmitting the first packet on the first channel as a contiguous, 480 megahertz bandwidth transmission. In some embodiments, transmitting at least part of a second packet on a second channel comprises hopping to the second channel in the hopping pattern after a link transmission of the first packet or after a fixed interval.

Another embodiment comprises one or more tangible computer-readable non-transitory storage media comprising computer-executable instructions operable to, when executed by at least one computer processor, enable the at least one computer processor to implement a method. The method may comprise determining a hopping pattern, the hopping pattern to indicate a pattern of channels in a 6 gigahertz to 10 gigahertz frequency band to which to hop in response to a trigger event; transmitting at least part of a first packet on a first channel indicated by the hopping pattern by generating a transmission having a bandwidth of at least 480 megahertz to transmit the first packet; and transmitting at least part of a second packet on a second channel indicated by the hopping pattern in response to an occurrence of the trigger event.

In some embodiments, receiving the at least part of the first packet on a first channel comprises receiving the at least part of the first packet on the first channel and a remainder of the first packet on one or more other channels, wherein the at least the 480 megahertz bandwidth transmission is non-contiguous. In some embodiments, receiving the at least part of the first packet on a first channel comprises receiving the first packet on the first channel as a contiguous, 480 megahertz bandwidth transmission. In some embodiments, receiving at least part of a second packet on a second channel comprises hopping to the second channel in the hopping pattern after a link transmission of the first packet or after a fixed interval.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features. For instance, some features may be selected at the time of manufacture by including or removing a circuit pathway or transistor. Further features may be selected at the time of deployment or after deployment via logic or a selectable preference such as a dipswitch or the like. A user after via a selectable preference such as a software preference, an e-fuse, or the like may select still further features.

A number of embodiments may have one or more advantageous effects. For instance, some embodiments may offer reduced MAC header sizes with respect to standard MAC header sizes. Further embodiments may include one or more advantageous effects such as smaller packet sizes for more efficient transmission, lower power consumption due to less data traffic on both the transmitter and receiver sides of communications, less traffic conflicts, less latency awaiting transmission or receipt of packets, and the like.

Another embodiment is implemented as a program product for implementing systems and methods described with reference to FIGS. 1-4. Some embodiments can take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments can take the form of a computer program product (or machine-accessible product) accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product.

What is claimed is:

1. An apparatus to transmit packets, the apparatus comprising:
   a physical layer logic to determine a hopping pattern, the hopping pattern to indicate a pattern of channels in a 6 gigahertz to 10 gigahertz frequency band to which to hop in response to a trigger event; and
   a physical layer device coupled with the physical layer logic to transmit at least part of a first packet on a first channel indicated by the hopping pattern by generation of a transmission having a bandwidth of at least 480 megahertz to transmit the first packet; and transmit at least part of a second packet on a second channel indicated by the hopping pattern in response to an occurrence of the trigger event.

2. The apparatus of claim 1, further comprising a processor, a memory coupled with the processor, a radio coupled with the physical layer device, and one or more antennas coupled with the radio to transmit the at least part of the first packet and the at least part of the second packet packet.

3. The apparatus of claim 1, wherein the physical layer device is configured to transmit the at least part of the first packet on the first channel and a remainder of the first packet on one or more other channels, wherein the transmission having the bandwidth of at least 480 megahertz is non-contiguous.

4. The apparatus of claim 1, wherein the physical layer device is configured to transmit the first packet on the first channel as a contiguous, 480 megahertz bandwidth transmission.

5. The apparatus of claim 1, wherein the physical layer device is configured to hop to the second channel in the hopping pattern after a link transmission of the first packet or after a fixed interval.

6. A method to transmit packets, the method comprising:
   determining a hopping pattern, the hopping pattern to indicate a pattern of channels in a 6 gigahertz to 10 gigahertz frequency band to which to hop in response to a trigger event;
   transmitting at least part of a first packet on a first channel indicated by the hopping pattern by generating a transmission having a bandwidth of at least 480 megahertz to transmit the first packet; and
   transmitting at least part of a second packet on a second channel indicated by the hopping pattern in response to an occurrence of the trigger event.

7. The method of claim 6, wherein transmitting the at least part of the first packet on a first channel comprises transmitting part of the first packet on the first channel, wherein the transmission having the bandwidth of at least 480 megahertz is non-contiguous.

8. The method of claim 6, wherein transmitting the at least part of the first packet on a first channel comprises transmitting the first packet on the first channel as a contiguous, 480 megahertz bandwidth transmission.

9. The method of claim 6, wherein transmitting at least part of a second packet on a second channel comprises hopping to the second channel in the hopping pattern after a link transmission of the first packet or after a fixed interval.

10. One or more tangible computer-readable non-transitory storage media comprising computer-executable instructions operable to, when executed by at least one computer processor, enable the at least one computer processor to implement a method comprising:

determining a hopping pattern, the hopping pattern to indicate a pattern of channels in a 6 gigahertz to 10 gigahertz frequency band to which to hop in response to a trigger event;

transmitting at least part of a first packet on a first channel indicated by the hopping pattern by generating a transmission having a bandwidth of at least 480 megahertz to transmit the first packet; and transmitting at least part of a second packet on a second channel indicated by the hopping pattern in response to an occurrence of the trigger event.

11. The storage media of claim 10, wherein transmitting the at least part of the first packet on a first channel comprises transmitting part of the first packet on the first channel, wherein the transmission having the bandwidth of at least 480 megahertz is non-contiguous.

12. The storage media of claim 10, wherein transmitting the at least part of the first packet on a first channel comprises transmitting the first packet on the first channel as a contiguous, 480 megahertz bandwidth transmission.

13. The storage media of claim 10, wherein transmitting at least part of a second packet on a second channel comprises hopping to the second channel in the hopping pattern after a link transmission of the first packet or after a fixed interval.

14. An apparatus to receive packets, the apparatus comprising;

a physical layer logic to determine a hopping pattern, the hopping pattern to indicate a pattern of channels in a 6 gigahertz to 10 gigahertz frequency band to which to hop in response to a trigger event; and a physical layer device coupled with the physical layer logic to receive at least part of a first packet on a first channel indicated by the hopping pattern via at least a 480 megahertz bandwidth transmission; and to receive at least part of a second packet on a second channel indicated by the hopping pattern in response to an occurrence of the trigger event.

15. The apparatus of claim 14, further comprising a processor, a memory coupled with the processor, a radio coupled with the physical layer device, and one or more antennas coupled with the radio to receive the at least part of the first packet and the at least part of the second packet packet.

16. The apparatus of claim 14, wherein the physical layer device is configured to receive the at least part of the first packet on the first channel and a remainder of the first packet on one or more other channels, wherein the at least the 480 megahertz bandwidth transmission is non-contiguous.

17. The apparatus of claim 14, wherein the physical layer device is configured to receive the first packet on the first channel as a contiguous, 480 megahertz bandwidth transmission.

18. The apparatus of claim 14, wherein the physical layer device is configured to hop to the second channel in the hopping pattern after a link transmission of the first packet or after a fixed interval.

19. A method to receive packets, the method comprising:

determining a hopping pattern, the hopping pattern to indicate a pattern of channels in a 6 gigahertz to 10 gigahertz frequency band to which to hop in response to a trigger event;

receiving at least part of a first packet on a first channel indicated by the hopping pattern via at least a 480 megahertz bandwidth transmission; and receiving at least part of a second packet on a second channel indicated by the hopping pattern in response to an occurrence of the trigger event.

20. The method of claim 19, wherein receiving the at least part of the first packet on a first channel comprises receiving the at least part of the first packet on the first channel and a remainder of the first packet on one or more other channels, wherein the at least the 480 megahertz bandwidth transmission is non-contiguous.

21. The method of claim 19, wherein receiving the at least part of the first packet on a first channel comprises receiving the first packet on the first channel as a contiguous, 480 megahertz bandwidth transmission.

22. The method of claim 19, wherein receiving at least part of a second packet on a second channel comprises hopping to the second channel in the hopping pattern after a link transmission of the first packet or after a fixed interval.

23. One or more tangible computer-readable non-transitory storage media comprising computer-executable instructions operable to, when executed by at least one computer processor, enable the at least one computer processor to implement a method comprising:

determining a hopping pattern, the hopping pattern to indicate a pattern of channels in a 6 gigahertz to 10 gigahertz frequency band to which to hop in response to a trigger event;

receiving at least part of a first packet on a first channel indicated by the hopping pattern via at least a 480 megahertz bandwidth transmission; and receiving at least part of a second packet on a second channel indicated by the hopping pattern in response to an occurrence of the trigger event.

24. The storage media of claim 23, wherein receiving the at least part of the first packet on a first channel comprises receiving the at least part of the first packet on the first channel and a remainder of the first packet on one or more other channels, wherein the at least the 480 megahertz bandwidth transmission is non-contiguous.

25. The storage media of claim 23, wherein receiving the at least part of the first packet on a first channel comprises receiving the first packet on the first channel as a contiguous, 480 megahertz bandwidth transmission.

\* \* \* \* \*